(12) United States Patent
Miyamoto

(10) Patent No.: US 8,369,835 B2
(45) Date of Patent: Feb. 5, 2013

(54) WEB SERVER CONSTITUTING SINGLE SIGN-ON SYSTEM, METHOD OF CONTROLLING OPERATION OF SAME, AND RECORDING MEDIUM STORING PROGRAM FOR CONTROLLING OPERATION OF SAME

(75) Inventor: Kentaro Miyamoto, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 102 days.

(21) Appl. No.: 12/979,279

(22) Filed: Dec. 27, 2010

(65) Prior Publication Data

US 2011/0207433 A1    Aug. 25, 2011

(30) Foreign Application Priority Data

Feb. 24, 2010    (JP) ................................ 2010-038092

(51) Int. Cl.
*H04M 1/66* (2006.01)
(52) U.S. Cl. ................ 455/411; 455/410; 455/412.1; 455/413; 455/414.1; 726/5; 726/6; 726/7; 726/8; 726/12
(58) Field of Classification Search .......... 455/411, 455/410, 412.1, 413, 414.1; 726/5, 6, 7, 726/8, 12, 17
See application file for complete search history.

(56) References Cited

U.S. PATENT DOCUMENTS

| | | | |
|---|---|---|---|
| 2005/0021791 A1* | 1/2005 | Sakiyama et al. | ............ 709/229 |
| 2006/0013268 A1 | 1/2006 | Terry | |
| 2008/0005789 A1* | 1/2008 | Kigo et al. | ............ 726/5 |
| 2008/0066168 A1* | 3/2008 | Gregg et al. | ............ 726/7 |
| 2008/0299611 A1 | 12/2008 | Steenstrup et al. | |
| 2010/0043065 A1* | 2/2010 | Bray et al. | ............ 726/8 |
| 2010/0137570 A1 | 6/2010 | Steenstrup et al. | |

FOREIGN PATENT DOCUMENTS

| | | | |
|---|---|---|---|
| JP | 2002-288139 | A | 10/2002 |
| JP | 2002288139 | A * | 10/2002 |
| JP | 2005-153261 | A | 6/2005 |
| JP | 2009-501014 | T | 1/2009 |
| JP | 2009-247030 | A | 10/2009 |

* cited by examiner

*Primary Examiner* — Ajit Patel
*Assistant Examiner* — Khai M Nguyen
(74) *Attorney, Agent, or Firm* — McGinn IP Law Group, PLLC

(57) ABSTRACT

A user ID and password are transmitted from a mobile telephone to a web server and whether the mobile telephone has the right to access the web server is authenticated. If the mobile telephone has the right to access the web server, a user ID and password for a first external server stored in a database are transmitted from the web server to the first external server. Authentication processing is executed in the first external server. If it is verified that the mobile telephone has the right to access the first external server, then the first external server generates authentication information and transmits this authentication information to the web server. In a case where the mobile telephone accesses the first external server, the generated authentication information is erased and then the first external server executes authentication processing.

4 Claims, 17 Drawing Sheets

*Fig. 12*

AUTHENTICATION INFORMATION VERIFICATION TABLE
FOR WEB SERVER

| AUTHENTICATION INFORMATION |
|---|
| user01 |
| ⋮ |

Fig. 13

| CHARACTER STRING | URL |
|---|---|
| MAIL 111 | http://systemA.com/mail.php |
| ADDRESS BOOK 112 | http://systemA.com/address.php |
| CALENDAR 113 | http://systemA.com/calendar.php |
| FILE SERVER 114 | http://systemB.com:8080/fileserver/ |
| SETUP MANAGEMENT 115 | http://main_system.com/setting/ |
| LOG OUT 116 | http://main_system.com/logout/ |

Fig. 14

USER INFORMATION TABLE FOR EXTERNAL SERVER

| IDENTIFICATION NO. | USER ID | ADDRESS OF EXTERNAL SERVER | USER ID FOR EXTERNAL SERVER | PASSWORD FOR EXTERNAL SERVER |
|---|---|---|---|---|
| 1 | user01 | http://systemA.com | user01@system.A.com | abc001 |
| 2 | user02 | http://systemA.com | user02@system.A.com | abc002 |
| 3 | user03 | http://systemA.com | user03@system.A.com | abc003 |
| 4 | user01 | http://systemB.com:8080 | fuji10056 | pass10056 |
| 5 | user02 | http://systemB.com:8080 | fuji10059 | pass10059 |
| 6 | user03 | http://systemB.com:8080 | fuji10088 | pass10088 |

Fig. 15

AUTHENTICATION INFORMATION TABLE FOR EXTERNAL SERVER

| EXTERNAL SERVER | USER ID | AUTHENTICATION INFORMATION |
|---|---|---|
| http://systemA.com | user01 | sysytemA_012345 |
| http://systemA.com | user02 | |
| http://systemA.com | user03 | sysytemA_6789ab |
| http://systemB.com:8080 | user01 | |
| http://systemB.com:8080 | user02 | BXYZ01 |
| http://systemB.com:8080 | user03 | BXYZ02 |

Fig. 16

EXTERNAL-SERVER AUTHENTICATION ERASURE COMMAND TABLE

| EXTERNAL SERVER | AUTHENTICATION COMMAND URL | AUTHENTICATION METHOD |
|---|---|---|
| http://systemA.com | /logout.php | GET |
| http://systemB.com:8080 | /session_destroy/ | POST |

Fig. 17

EXTERNAL-SERVER AUTHENTICATION COMMAND METHOD TABLE

| EXTERNAL SERVER | AUTHENTICATION COMMAND URL | AUTHENTICATION METHOD |
|---|---|---|
| http://systemA.com | /login.php | GET |
| http://systemB.com:8080 | /session_create/ | POST |

*Fig. 21*

ENCRYPTION/DECRYPTION TABLE

| ENCRYPTED AUTHENTICATION INFORMATION FOR WEB SERVER | USER ID | ORIGINAL URL |
|---|---|---|
| abcded0811 | user01 | http://main_system.com/mail.php?id=user001 |
| abcded0812 | user01 | http://systemA.com/mail.php?id=user01 |

WEB SERVER CONSTITUTING SINGLE SIGN-ON SYSTEM, METHOD OF CONTROLLING OPERATION OF SAME, AND RECORDING MEDIUM STORING PROGRAM FOR CONTROLLING OPERATION OF SAME

BACKGROUND OF THE INVENTION

1. Field of the Invention

This invention relates to a web server constituting a single sign-on system, a method of controlling the operation of this web server, and a non-transitory recording medium storing a program for controlling the operation of the web server.

2. Description of the Related Art

Authentication is often required when a user utilizes a server (see Japanese Patent Application Laid-Open No. 2009-247030). Since performing such authentication for every server is troublesome, use is made of a single sign-on system in which a user can utilize all allowed functions merely by being authenticated a single time (see Japanese Patent Application Laid-Open Nos. 2005-153261, 2009-501014 and 2002-288139).

However, since single sign-on allows utilization of multiple servers by a single authentication, there is a need for more robust authentication.

SUMMARY OF THE INVENTION

An object of the present invention is to realize single sign-on featuring more robust authentication.

The present invention provides a web server constituting a mobile-telephone single sign-on system in which, in response to a mobile telephone being authenticated at a web server, the mobile telephone becomes capable of accessing an external server, which is different from the web server, without authentication processing being executed between the external server and the mobile telephone, the web server comprising: an authentication processing device (means) for executing authentication processing to authenticate the mobile telephone in response to an access request, which is transmitted from the mobile telephone, to access a web page of the web server; a first web page data transmitting device (means) for transmitting web page data, which represents the web page of the web server, to the mobile telephone in response to verification by the authentication processing device of the fact that the mobile telephone has the right to access the web page of the web server; a determination device (means), responsive to receipt of an access request, which is for accessing a web page of the external server, transmitted from the mobile telephone in response to the mobile telephone receiving the web page data of the web server transmitted from the first web page data transmitting device, for determining whether mobile-telephone authentication information for the external server, which is stored in accordance with verification of the fact that the mobile telephone has the right to access the web page of the external server, has been stored in a storage device; an erase-command transmitting device (means), responsive to a determination by the determination device that the mobile-telephone authentication information for the external server has been stored, for transmitting to the external server an erase command, which is for erasing the authentication information for the external server stored in the external server in response to verification of the fact that the mobile telephone has the right to access the web page of the external server; a user information transmitting device (means), responsive to transmission of the erase command to the external server by the erase-command transmitting device or to a determination by the determination device that the mobile-telephone authentication information for the external server has not been stored, for transmitting user information to the external server, the user information, which has been stored in advance, being used in authentication processing to determine whether the mobile telephone has the right to access the web page of external server; a receiving device (means) for receiving the authentication information for the external server and the web page data representing the web page, which are transmitted from the external server, in response to verification of the fact that the mobile telephone has the right to access the web page of the external server, this being verified by authentication processing executed at the external server in response to transmission of the user information to the external server by the user information transmitting device; a storage control device (means) for controlling the storage device so as to store the authentication information for the external server received by the receiving device; and a second web page data transmitting device (means) for transmitting the web page data, which has been transmitted from the external server and received by the receiving device, to the mobile telephone.

The present invention also provides an operation control method suited to the above-described web server constituting a single sign-on system. Specifically, the present invention provides a method of controlling operation of a web server constituting a mobile-telephone single sign-on system in which, in response to a mobile telephone being authenticated at a web server, the mobile telephone becomes capable of accessing an external server, which is different from the web server, without authentication processing being executed between the external server and the mobile telephone, the method comprising the steps of: executing authentication processing to authenticate the mobile telephone in response to an access request, which is transmitted from the mobile telephone, to access a web page of the web server; transmitting web page data, which represents the web page of the web server, to the mobile telephone in response to verification of the fact that the mobile telephone has the right to access the web page of the web server; in responsive to receipt of an access request, which is for accessing a web page of the external server, transmitted from the mobile telephone in response to the mobile telephone receiving the transmitted web page data of the web server, determining whether mobile-telephone authentication information for the external server, which is stored in accordance with verification of the fact that the mobile telephone has the right to access the web page of the external server, has been stored in a storage device; in response to a determination that the mobile-telephone authentication information for the external server has been stored, transmitting to the external server an erase command, which is for erasing the authentication information for the external server stored in the external server in response to verification of the fact that the mobile telephone has the right to access the web page of the external server; in response to transmission of the erase command to the external server or to a determination that the mobile-telephone authentication information for the external server has not been stored, transmitting user information to the external server, the user information, which has been stored in advance, being used in authentication processing to determine whether the mobile telephone has the right to access the web page of external server; receiving the authentication information for the external server and the web page data representing the web page, which are transmitted from the external server, in response to verification of the fact that the mobile telephone has the right to access the web page of the external server, this being verified by authentication processing executed at the external server in response to transmission of the user information to the external server; controlling the storage device so as to store the received authentication information for the external server; and transmitting the received web page data, which has been transmitted from the external server, to the mobile telephone.

The present invention further provides a recording medium storing a computer-readable program for implementing the above-described method of controlling the operation of a web server constituting a single sign-on system.

In accordance with the present invention, a mobile telephone requests a web server (transmits an access request) for access to a web page of the web server. In response to the access request, the web server executes processing for authenticating the mobile telephone. If it is verified by the authentication processing that the mobile telephone possesses the right to access the web page of the web server, the web server transmits web page data to the mobile telephone.

The web page data transmitted from the web server is received by the mobile telephone and the mobile telephone sends the web server a request to access the web page of an external server.

When the request, transmitted from the mobile telephone, to access the web page of the external server is received by the web server, it is determined, in response to verification of the fact that the mobile telephone has the right to access the web page of the external server, whether authentication information of the mobile telephone for use by the external server, which information is stored in a storage device, has been stored in the storage device. If the authentication information for the external server has been stored in the storage device, this means that the authentication information for the external server has been generated in the external server and, hence, that this information has been stored in the external server as well. The web server sends the external server a command to erase the authentication information for the external server. Authentication information for the external server that has already been generated is erased from the external server.

In a case where the erase command has been transmitted to the external server or the authentication information for the external server has not been stored in the storage device, mobile-telephone user information used in authentication processing for determining whether the mobile telephone has the right to access the web page of the external server is transmitted from the web server to the external server. When the mobile-telephone user information is received by the external server, the external server executes authentication processing based upon this user information. If the fact that the mobile telephone has the right to access the web page of the external server is verified in this authentication processing, then the authentication information for the external server and the web page data representing the web page whose access was requested from the mobile telephone are transmitted from the external server to the mobile telephone. The authentication information for the external server is stored in the storage device. The web page data transmitted from the external server is transmitted from the web server to the mobile telephone.

In accordance with the present invention, when the mobile telephone is authenticated at the web server and requests access to the web page of the external server, the mobile-telephone user information stored beforehand in the web server is transmitted from the web server to the external server, and the external server executes processing for authenticating the mobile telephone based upon this user information. As a result, it is no longer necessary to transmit the user information from the mobile telephone to the external server and to execute authentication processing with respect to the external server (i.e., single sign-on is possible). In particular, according to the present invention, authentication information for the external server transmitted from the external server to the web server is erased from the external server. This means that authentication processing at the external server is executed whenever there is a request to access the web page of the external server. Since authentication processing for verifying whether the mobile telephone has the right to access the web page of the external server is not executed using the authentication information for the external server once it has been generated, authentication is made more robust. Further, since authentication processing at the external server is not executed using the authentication information for the external server once it has been generated, the transition to the web page can be performed reliably even in a case where access is made from the web page of the external server to another web page of the external server. Further, since the authentication information for the external server is erased, a needless increase in this information can be prevented.

It may be so arranged that the apparatus further comprises a web-server-use authentication information generating device (means) for generating mobile-telephone authentication information for the web server in response to verification by the authentication processing device of the fact that the mobile telephone has the right to access the web page of the web server; and an encrypting device (means) for encrypting the authentication information for the web server generated by the web-server-use authentication information generating device. In this case, the first web page data transmitting device would transmit the authentication information for the web server encrypted by the encrypting device and the web page data representing the web page of the web server to the mobile telephone, by way of example. Further, the apparatus may comprise a decrypting device (means) for decrypting the encrypted authentication information for the web server in response to receipt of the request for accessing the web page of the external server and the encrypted authentication information for the web server, which are transmitted from the mobile telephone in response to the mobile telephone receiving the authentication information for the web server and the web page data representing web page of the web server, which have been transmitted from the first web page data transmitting device. In this case, the user information transmitting device, responsive to the authentication information for the web server decrypted by the decrypting device matching the authentication information for the web server generated by the web server authentication information generating device and, moreover, to transmission of the erase command to the external server by the erase-command transmitting device or to a determination by the determination device that mobile-telephone authentication information for the web server has not been stored, transmits user information to the external server, the user information, which has been stored in advance, being used in authentication processing to determine whether the mobile telephone has the right to access the web page of external server.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is an example of an authentication information verification table for a web server;

FIG. 13 is a table showing the corresponding relationship between character strings and link-destination URLs;

FIG. 14 is an example of a user information table for external servers;

FIG. 15 is an example of an authentication information table for external servers;

FIG. 16 is an example of an authentication erasure command table for external servers;

FIG. 17 is an example of an authentication command method table for external server;

FIG. 21 is an example of encryption/decryption table.

DESCRIPTION OF THE PREFERRED EMBODIMENTS

Preferred embodiments of the present invention will be described with reference to the drawings.

Figure 1:
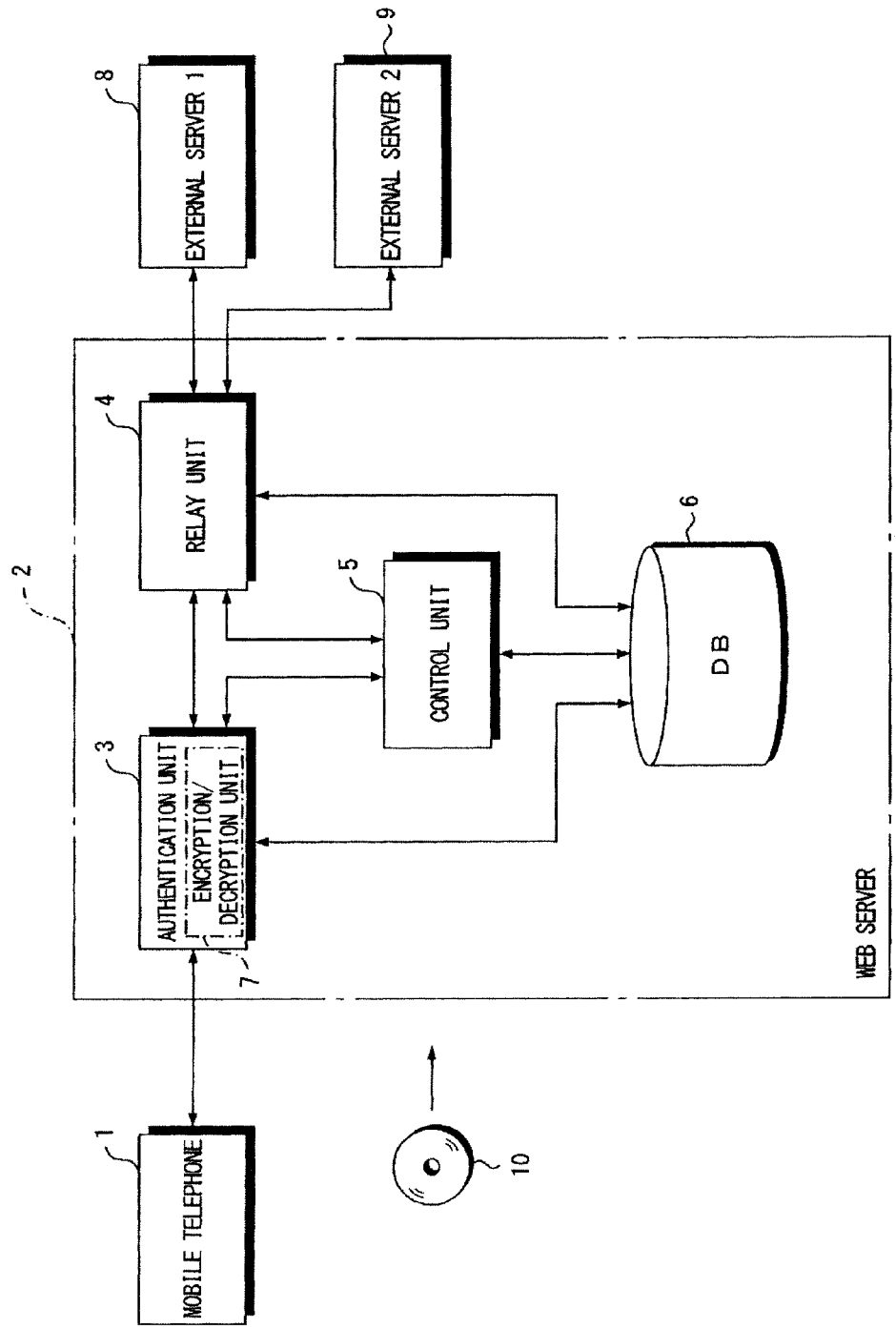
FIG. 1 is a block diagram illustrating the electrical configuration of a single sign-on system.

FIG. 1 is a block diagram illustrating a mobile-telephone single sign-on system according to an embodiment of the present invention.

A single sign-on system includes a mobile telephone 1, a web server 2, a first external server 8 and a second external server 9. The mobile telephone 1 and web server 2 communicate directly, and the web server 2 communicates directly with the first external server 8 and second external server 9. The mobile telephone 1 communicates with the first external server 8 or second external server 9 via the web server 2. Although two external servers, namely the first external server 8 and the second external server 9, are illustrated, an arrangement in which only one external server communicates with the web server 2 or in which three of more external servers communicate with the web server 2 is permissible.

The overall operation of the web server 2 is controlled by a control unit 5. The web server 2 includes an authentication unit 3 for executing processing to authenticate whether the user of the mobile telephone 1 has the right to access the web server 2; a relay unit 4 for relaying data communication between the mobile telephone 1 and the first external server 8 and second external server 9; and a database 6 for storing various table, etc., described later. The operation of the web server 2, described later, is based upon an operation program that has been stored on a CD-ROM [Compact Disk-Read-Only Memory (recording medium)] 10. The web server 2 is caused to operate by installing the operation program, which has been stored on the CD-ROM 10, in the web server 2. Naturally, rather than installing the operation program from the CD-ROM 10, the operation program may be pre-installed or installed via the Internet.

In this embodiment, the mobile telephone 1 transmits the user ID and a password to the web server 2. When the web server 2 authenticates that the user of the mobile telephone 1 is one having authorization to utilize the web server 2, the web server 2 authenticates whether the user of the mobile telephone 1 is one having authorization to utilize the first external server 8 or the second external server 9, without the user ID and password (user information) being transmitted from the mobile telephone 1 to the first external server 8 or second external server 9 (i.e., single sign-on is possible). Authentication processing in the web server 2 and authentication processing in the first external server 8 or second external server 9 (authentication processing in the first external server 8 will be dealt with in this embodiment) is executed without the user of the mobile telephone 1 inputting a user ID and password multiple times.

FIGS. 2 to 9 are flowcharts illustrating processing executed in this single sign-on system.

The mobile telephone 1 accesses a prescribed URL (Uniform Resource Locator) for logging into the web server 2. When this is done, web page data representing the log-in web page is read from the database 6 of web server 2 and the web page data that has been read is transmitted from the web server 2 to the mobile telephone 1.

Figure 2:
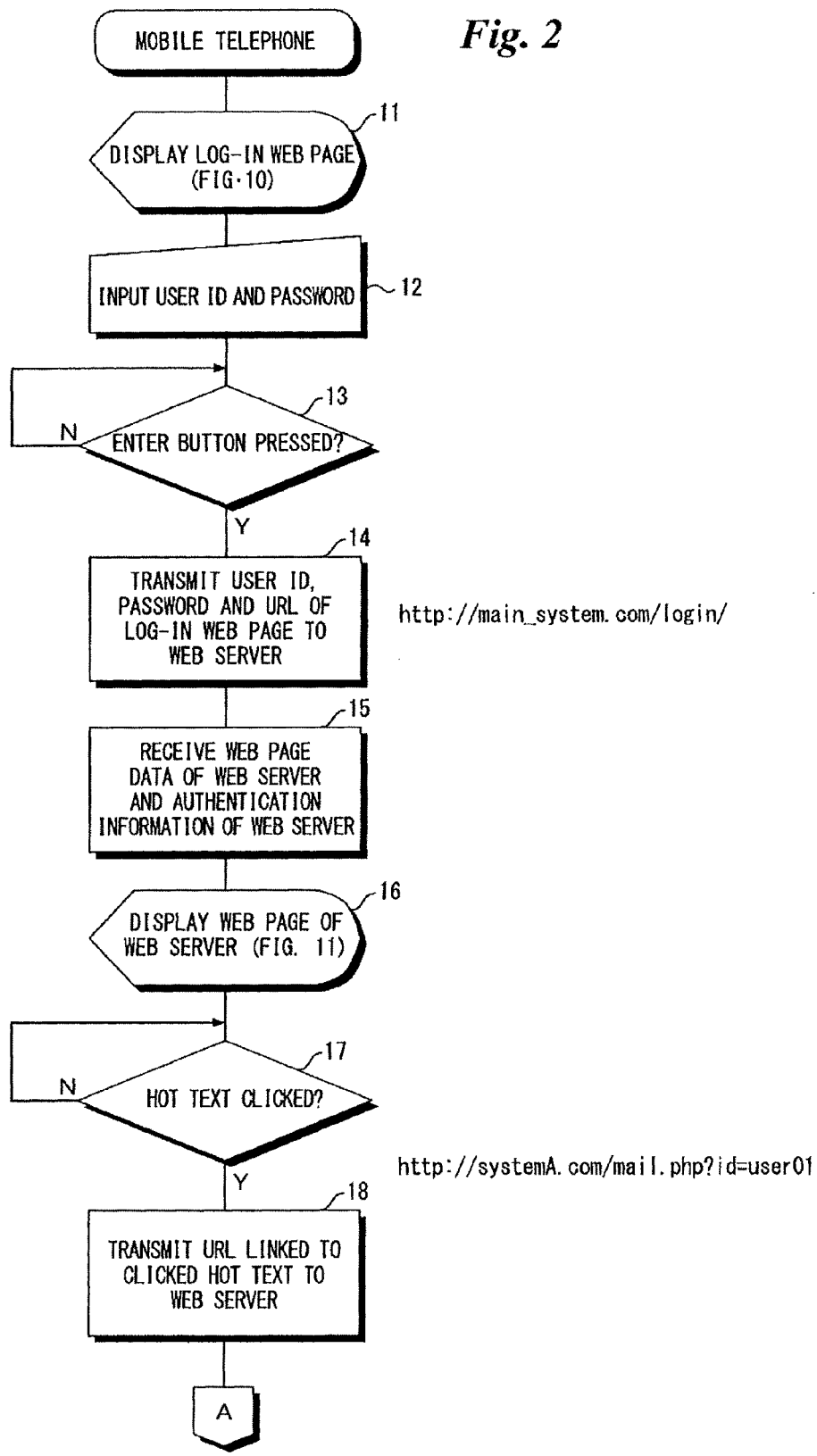
FIG. 2 is a flowchart illustrating processing executed by a mobile telephone.

When the web page data transmitted from the web server 2 is received by the mobile telephone 1, the log-in web page is displayed on the display screen of the mobile telephone 1 (step 11 in FIG. 2).

Figure 10:
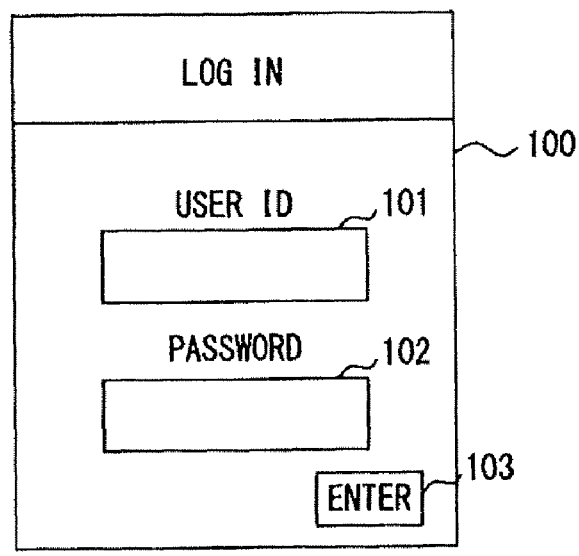
FIG. 10 is an example of a web page displayed on a mobile telephone.

FIG. 10 is an example of a log-in web page 100 displayed on the display screen of mobile telephone 1.

The log-in web page 100 includes a user ID display field 101, a password display field 102 and a clickable ENTER button 103. A cursor (not shown) is placed in the user ID display field 101 and the user ID of the user of mobile telephone 1 is input in the field 101 using a numeric keypad (not shown) of the mobile telephone 1. When this done, the user ID that has been input is displayed in the user ID display field 101. Similarly, the cursor is placed in the password display field 102 and the password of the user of mobile telephone 1 is input in the field 102 using the numeric keypad of the mobile telephone 1. When this done, asterisks are displayed in the password display field 102 in conformity with the number of characters of the password that has been input. If the ENTER button 103 is clicked, the user ID being displayed in the user ID display field 101 and the password being displayed in the password display field 102 are transmitted from the mobile telephone 1 to the web server 2.

With reference again to FIG. 2, the log-in web page is displayed on the display screen of the mobile telephone 1 and the user ID and password are input by the user of the mobile telephone 1 (step 12) in the manner described above. If the ENTER button is pressed (clicked) ("YES" at step 13), the user ID and password that have been input, as well as the URL (e.g., http://main_system.com/login/) of the log-in web page (namely a request to access the web page of the web server 2) are transmitted from the mobile telephone 1 to the web server 2 (step 14).

Figure 4:
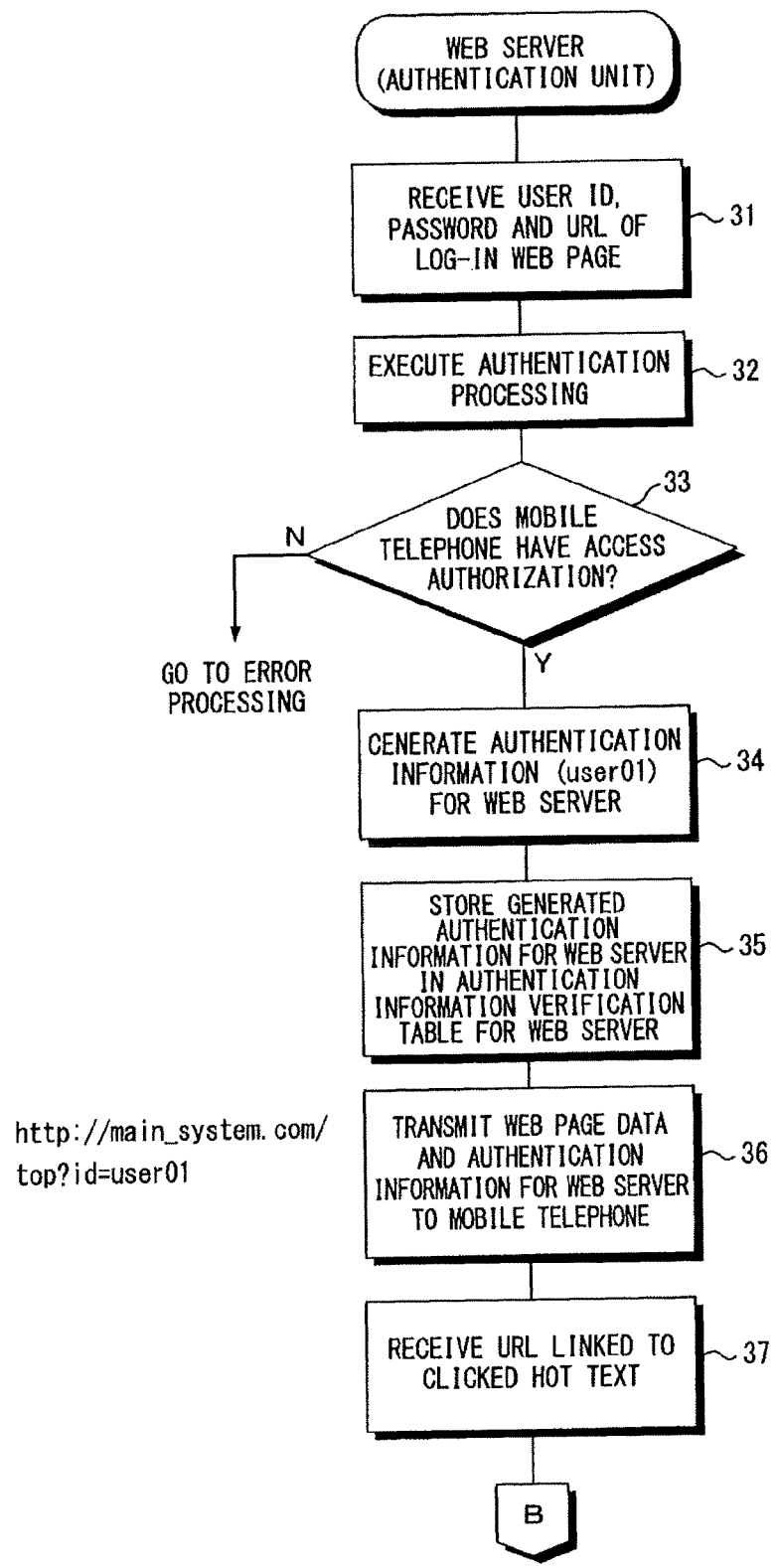
FIG. 4 is a flowchart illustrating processing executed by an authentication unit.

The user ID, password and URL of the log-in web page transmitted from the mobile telephone 1 are received by the authentication unit 3 of web server 2 (step 31 in FIG. 4). An authentication table, in which the user IDs and passwords of users who possess the right to access the web server 2 (namely the right to utilize the services of the website usable from the log-in web page) have been correlated, has been stored in the database 6. If the set composed of a user ID and password transmitted from the mobile telephone 1 has been stored in this authentication table, then it is judged that the user of the mobile telephone 1 who transmitted the user ID and password has the right to access the web server 2 (this is authentication processing) (step 32 in FIG. 4).

If the mobile telephone 1 that transmitted the user ID and password is a mobile telephone having the access authorization ("YES" at step 33 in FIG. 4), then the authentication unit 3 generates authentication information (user1) for the web server (step 34 in FIG. 4). The generated authentication information for the web server is stored in an authentication information verification table for the web server (step 35 in FIG. 4).

FIG. 12 is an example of an authentication information verification table for the web server.

Stored in the authentication information verification table for the web server is authentication information for the web server generated in a case where it has been verified that the mobile telephone has the right to access the web server 2, as described above. In a case where the mobile telephone 1 verified by authentication accesses the web server 2 again, whether the mobile telephone has the right to access the web server 2 is verified again using the authentication information that has been stored in the authentication information verification table for the web server.

With reference again to FIG. 4, when it is verified by authentication that the mobile telephone 1 has the right to access the web server 2, web page data representing a menu web page and the generated authentication information for the web server are transmitted from the authentication unit 3 of web server 2 to the mobile telephone 1 (step 36). The authentication information for the web server is transmitted from the web server 2 to the mobile telephone 1 upon being appended to the URL of the menu web page (step 36). For example, if the URL of the menu web page is http://main_system.com/top, then a question mark is appended to this URL, the authentication information is added on following the question mark and the result is transmitted from the web server 2 to the mobile telephone 1 (http://main_system.com/top?id=user01).

When the web page data and authentication information (URL) for the web server transmitted from the web server 2 are received by the mobile telephone 1 (step 15 in FIG. 2), the menu web page represented by the received web page data is displayed on the display screen of the mobile telephone 1 (step 16 in FIG. 2).

Figure 11:
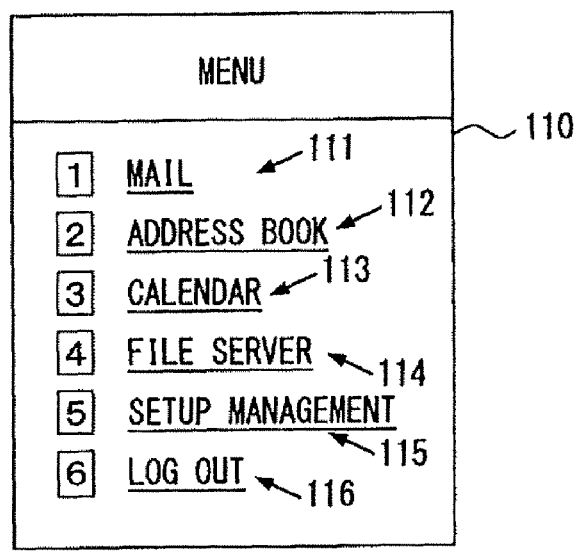
FIG. 11 is an example of a web page displayed on a mobile telephone.

FIG. 11 is an example of a menu web page 110.

Displayed in the menu web page 110 are a character string 111 reading "MAIL", a character string 112 reading "ADDRESS BOOK", a character string 113 reading "CALENDAR", a character string 114 reading "FILE SERVER", a character string 115 reading "SETUP MANAGEMENT" and a character string 116 reading "LOG OUT". The character strings 111 to 116 are clickable hot text. These character strings 111 to 116 are clicked in a case where a service is requested from a website of the web server 2, first external server 8 or second external server 9.

A web mail service specified by the character string 111 reading "MAIL", an address book service utilizing a website specified by the character string 112 reading "ADDRESS BOOK", and a calendar service utilizing a website specified by the character string 113 reading "CALENDAR" are provided utilizing the web page of the first external server 8. A file storage service utilizing a website specified by the character string 114 reading "FILE SERVER" is provided utilizing the web page of the second external server 9. The web server 2 is utilized for a service specified by the character string 115 reading "SETUP MANAGEMENT" and for log-out processing specified by the character string 116 reading "LOG OUT".

Links have been established to (embedded in) respective ones of the character string 111 reading "MAIL", the character string 112 reading "ADDRESS BOOK", the character string 113 reading "CALENDAR", the character string 114 reading "FILE SERVER", the character string 115 reading "SETUP MANAGEMENT" and the character string 116 reading "LOG OUT".

FIG. 13 illustrates the corresponding relationship between character strings and URLs linked to these character strings.

The web mail service specified by the character string 111 reading "MAIL", the address book service utilizing the website specified by the character string 112 reading "ADDRESS BOOK" and the calendar service utilizing the website specified by the character string 113 reading "CALENDAR" are provided utilizing the web page of the first external server 8. The domain names of the URLs linked to the respective character strings 111, 112 and 113 are the same domain name "systemA.com" of the first external server 8. The file storage service utilizing a website specified by the character string 114 reading "FILE SERVER" is provided utilizing the web page of the second external server 9. The domain name of the URL of the link to the character string 114 is the domain name "systemB.com" of the second external server 9. Since the web server 2 is utilized for the service specified by the character string 115 reading "SETUP MANAGEMENT" and for log-out processing specified by the character string 116 reading "LOG OUT", the domain names of the URLs of the links to the character strings 115 and 116 are the domain name "main_system.com" of the web server 2.

If the character string 111 reading "MAIL", the character string 112 reading "ADDRESS BOOK", the character string 113 reading "CALENDAR", the character string 114 reading "FILE SERVER", the character string 115 reading "SETUP MANAGEMENT" or the character string 116 reading "LOG OUT" is clicked, data representing the URL of the link to the clicked character string is transmitted from the mobile telephone 1 to the web server 2.

With reference again to FIG. 2, if any of the character strings (hot text) 111 to 116 is clicked ("YES" at step 17), data representing the URL of the link to the clicked hot text is transmitted from the mobile telephone 1 to the authentication unit 3 of web server 2 (step 18). For example, if the character string 111 reading "MAIL" is clicked, the authentication information for the web server is appended to the URL (http://systemA.com/mail.php) of the link to the character string 111 reading "MAIL" and the result is transmitted from the mobile telephone 1 to the authentication unit 3 of web server 2 (http://systemA.com/mail.php?id=user01 is transmitted).

Figure 5:
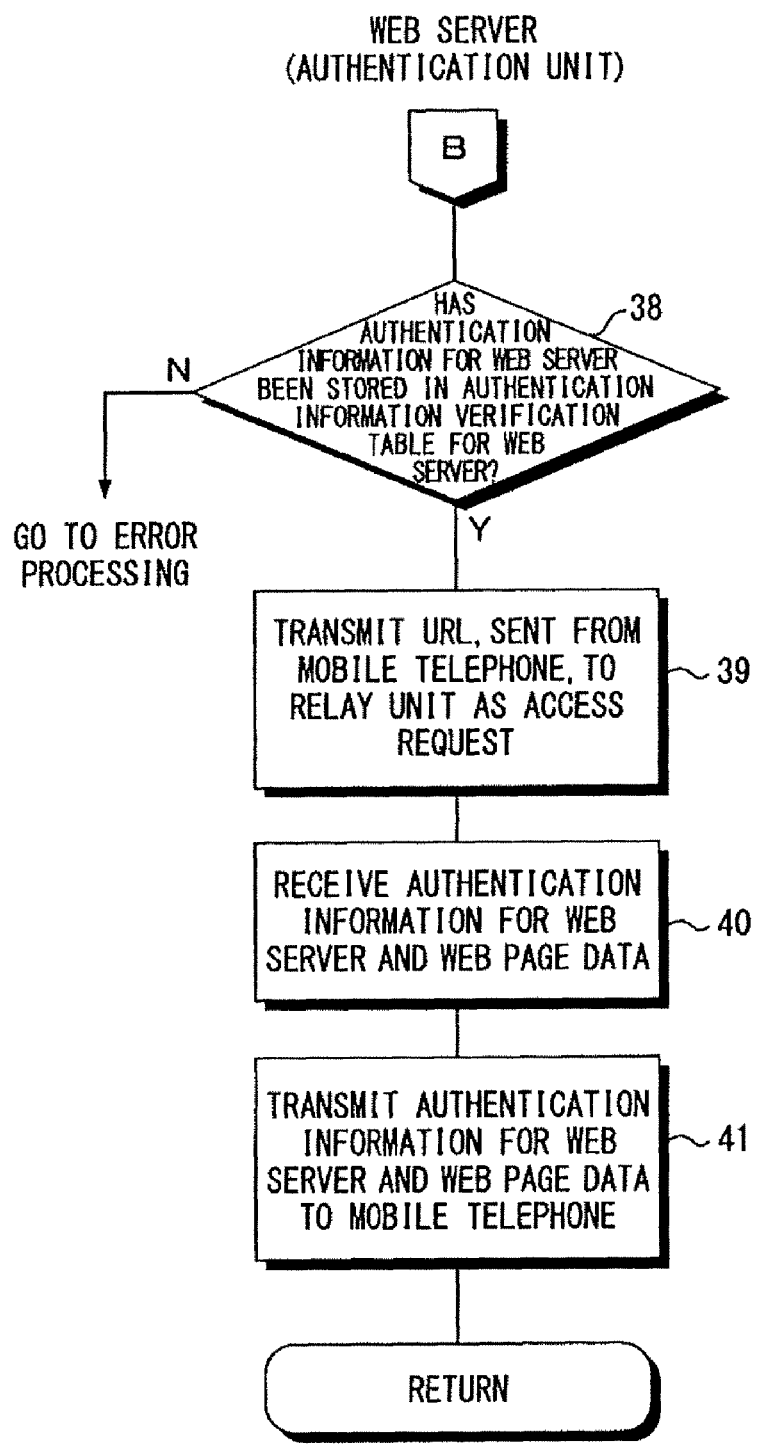
FIG. 5 is a flowchart illustrating processing executed by an authentication unit.

When the URL with the appended authentication information of the web server transmitted from the mobile telephone 1 is received by the authentication unit 3 of web server 2 (step 37 in FIG. 4), whether the authentication information of the web server appended to the received URL has been stored in the authentication information verification table of the web server contained in the database 6 is verified (step 38 in FIG. 5). If the authentication information of the web server appended to the received URL has been stored in the authentication information verification table of the web server ("YES" at step 38), this means that the mobile telephone 1 that has accessed the web server 2 is reconfirmed by authentication to be that of a user having access authorization. The URL transmitted from the mobile telephone 1 is transmitted from the authentication unit 3 to the relay unit 4 as a request to access the first external server 8 (step 39 in FIG. 5).

Figure 6:
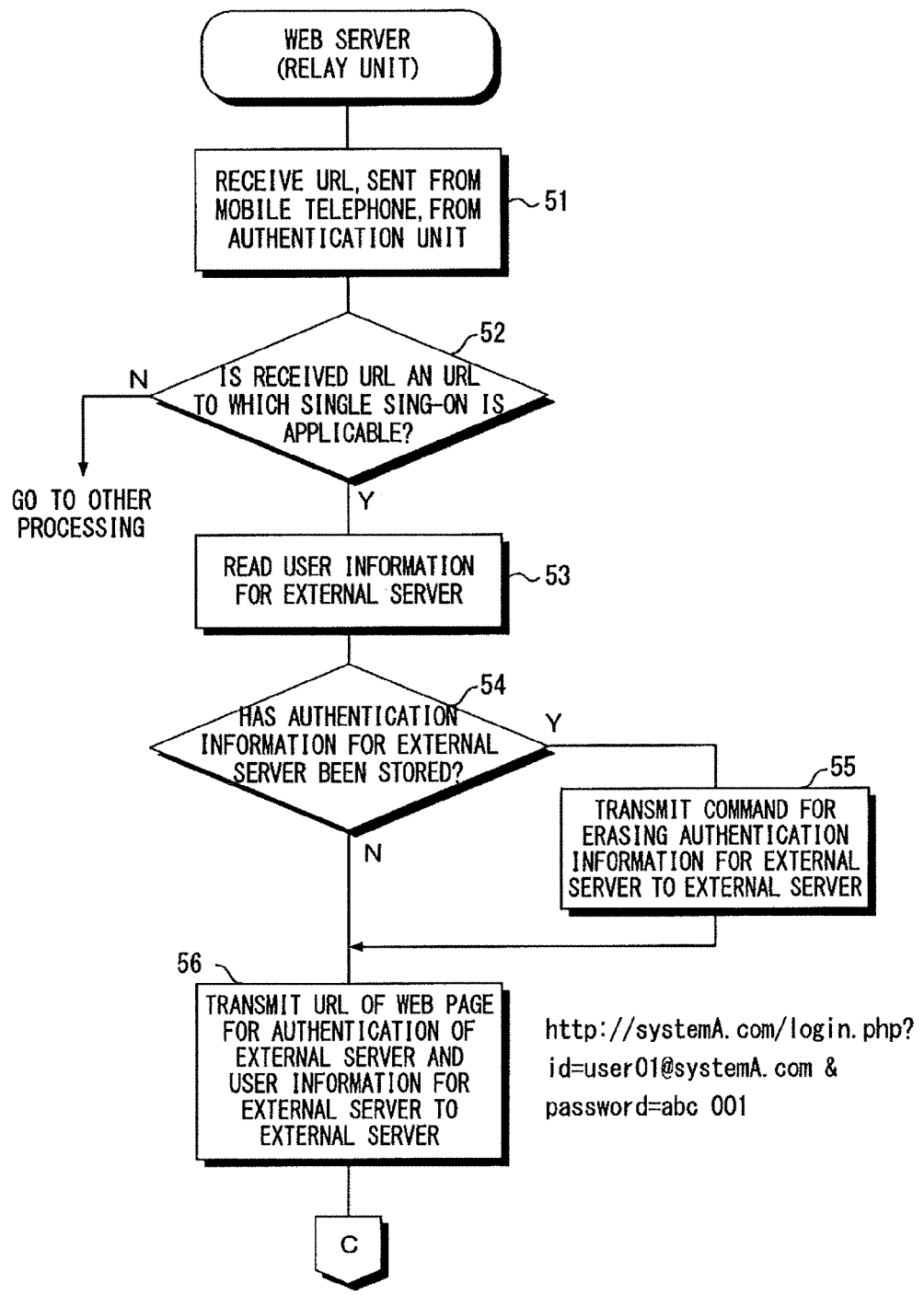
FIG. 6 is a flowchart illustrating processing executed by relay unit.

When the URL transmitted from the authentication unit 3 is received by the relay unit 4 (step 51 in FIG. 6), whether the received URL is an URL to which single sign-on is applicable is checked (step 52 in FIG. 6). URLs to which single sign-on is applicable have been stored in the database 6. Whether the received URL is a previously stored URL to which single sign-on is applicable is verified. If the received URL is an URL to which single sign-on is applicable ("YES" at step 52), then user information is read from a user information table for external servers stored in the database 6 (step 53 in FIG. 6).

FIG. 14 is an example of the user information table for external servers.

Stored in the user information table for external servers in correspondence with ID numbers are user IDs, addresses of external servers, user IDs for external servers and passwords for external servers. If a user ID and an address of an external server are known, then a user having this user ID can read the user ID for the external server and the password for the external server (namely the user information), which are necessary in a case where a service provided by the website of the external server is utilized, from the user information for the external server.

With reference again to FIG. 6, when the user information for the external server is read, whether authentication information of the user of mobile telephone 1, which information pertains to the external server of the website whose service is to be received by the user of the mobile telephone 1, has been stored in an authentication information table for external users contained in the database 6 is checked (step 54).

In this embodiment, as will be described later, if authentication of the external server is executed using the user ID for the external server and the password for the external server that have been stored in the user information table for external servers and it is verified that this is access from a user having authorization, then authentication information for the external server is generated by the external server and this information is stored in the authentication information table for external servers. If the authentication information for external servers has been stored in the authentication information table for external servers, then it will be understood that external-server authentication has been performed in the past. If authentication has been performed by the external server in the past, then the authentication information for the external server has been stored in the external server. The external server can be made to execute authentication processing using this authentication information for the external server. In this embodiment, however, authentication processing by an external server is not executed using authentication information for the external server generated in the past. Rather, even if authentication processing has been executed in an external server in the past, the authentication information for the external server that has been stored in the external server is erased and authentication processing is executed anew by the external server using the user ID for the external server and the password for the external server.

If the authentication information for the external server has been stored in the authentication information table for external servers ("YES" at step 54), then a command to erase the authentication information for the external server is transmitted to the first external server 8 (step 55 in FIG. 6).

FIG. 16 is an example of an external-server authentication erasure command table.

An external-server authentication erase command has been decided for every external server. For example, in the case of the first external server 8, a command to erase the authentication information for the external server is applied to the first external server 8 by sending the first external server 8 the URL obtained by appending (/logout.php) to the domain name (http://systemA.com) of first external server 8. Authentication methods have also been stored in the external-server authentication erasure command table.

If the authentication information for the external server has not been stored in the authentication information table for external servers ("NO" at step 54), then the URL of the web page for authentication of the external server is read from the external-server authentication command method table contained in the database 6. The read URL of the web page for authentication of the external server and the user information (user ID for the external server and password for the external server) read from the user information for the external server are transmitted from the relay unit 4 to the first external server 8 (step 56 in FIG. 6) (this is a request to access the first external server 8).

FIG. 17 is an example of an external-server authentication command method table.

An external-server authentication command method has been decided for every external server. For example, in case of first external server 8, an authentication command is applied to the first external server 8 by sending the first external server 8 the URL obtained by appending (/login.php) to the domain name (http://systemA.com) of first external server 8. In this embodiment, the user ID for the external server and the password for the external server are appended to this URL and the result is transmitted to the first external server 8 (http://systemA.com/login.php?id=user01@systemA.com&passwrd=abc001 is transmitted).

With reference again to FIG. 8, when the command to erase the authentication information for the external server is received by the first external server 8 ("YES" at step 71), the authentication information for the external server generated in the past is erased from the first external server 8 (step 72 in FIG. 8) in the manner described above. If the command to erase the authentication information for the external server is not received ("NO" at step 71), then the processing of step 72 is skipped.

Figure 8:
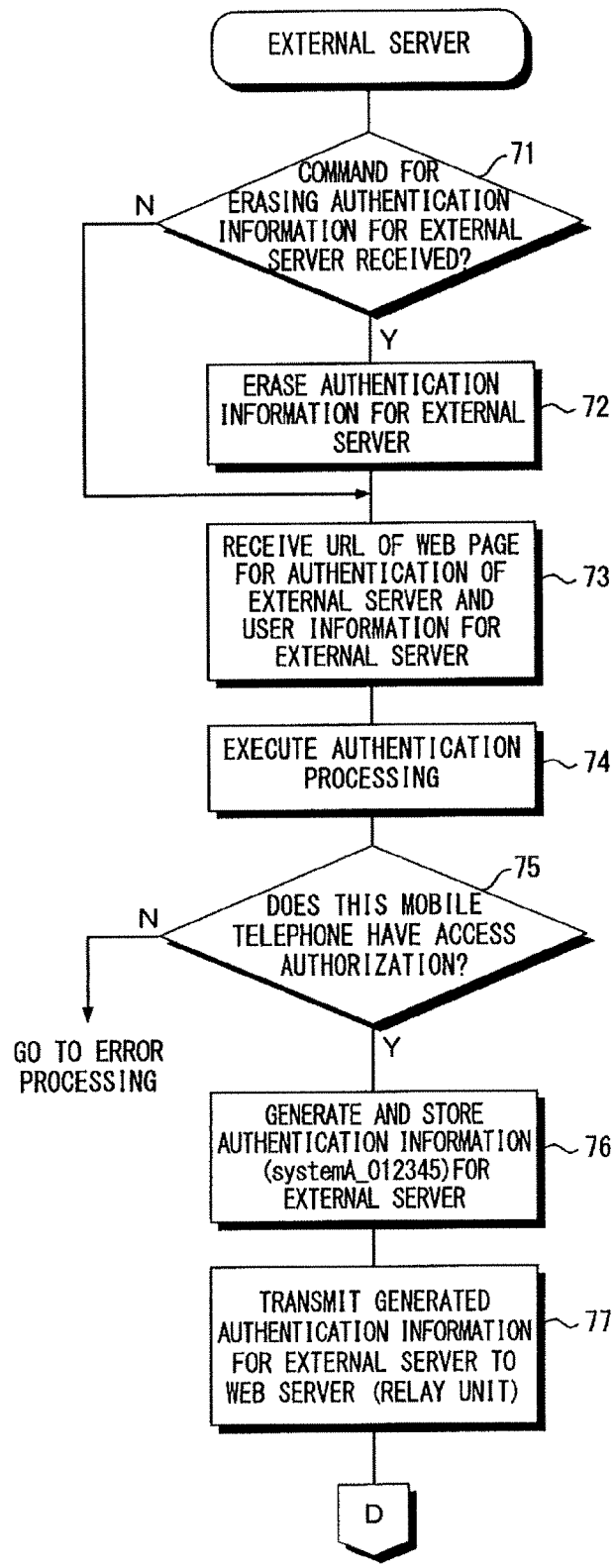
FIG. 8 is a flowchart illustrating processing executed by a first external server.

The URL of the web page for authentication of the external server and the user information for the external server transmitted from the relay unit 4 are received by the first external server 8 (step 73 in FIG. 8). In response, the external server 8 executes authentication processing using the received user information for the external server (step 74 in FIG. 8).

If the result of authentication processing is that the mobile telephone 1 is a mobile telephone having the right to access the first external server 8 ("YES" at step 75 in FIG. 8), the authentication information (systemA_012345) for the external server is generated and stored in the first external server 8 (step 76 in FIG. 8). The generated authentication information for the external server is transmitted from the first external server 8 to the relay unit 4 of web server 2 (step 77 in FIG. 8).

Figure 7:
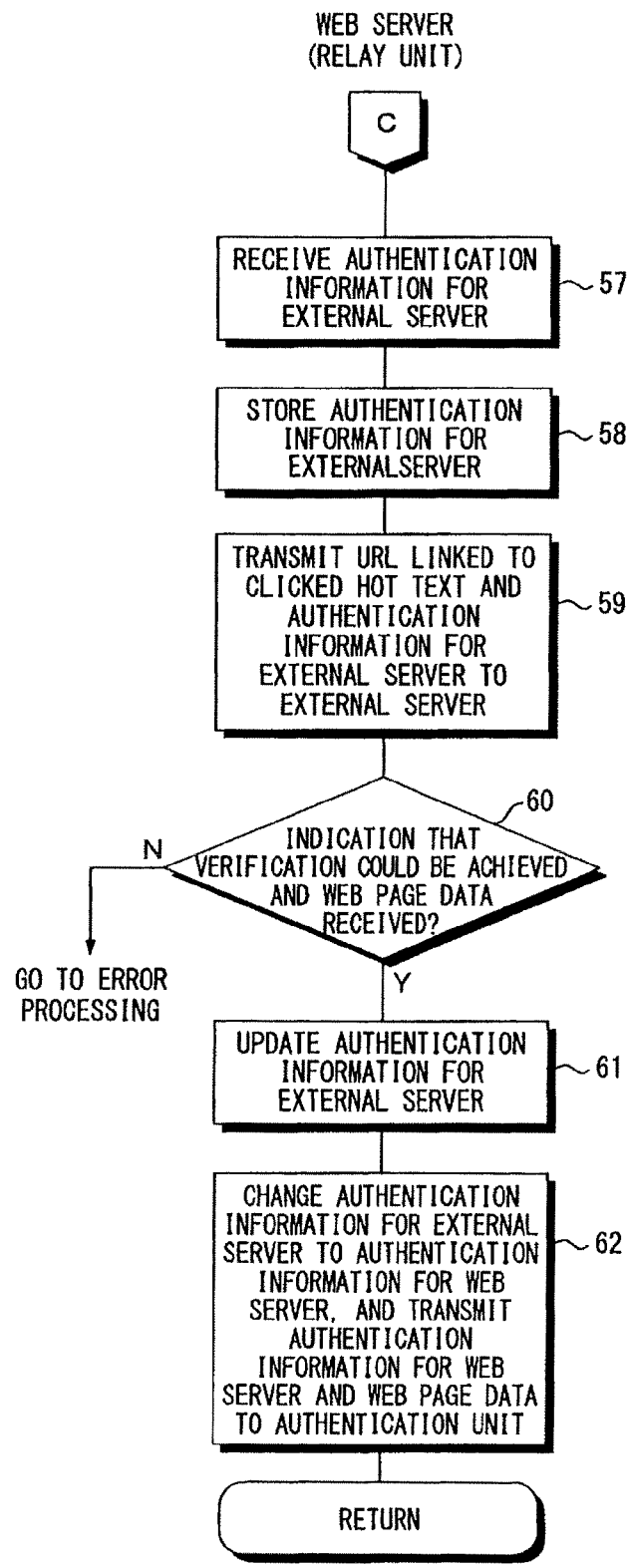
FIG. 7 is a flowchart illustrating processing executed by relay unit.

When the authentication information for the external server transmitted from the first external server 8 is received by the relay unit 4 (step 57 in FIG. 7), the received authentication information for the external server is stored in the authentication information table for the external server (step 58 in FIG. 7). When the authentication information for the external server is received, it is verified that the mobile telephone 1 has the right to access the first external server 8. The authentication information for the external server is appended to the URL linked to the hot text clicked at the mobile telephone 1 and the resultant URL (http://systemA.com/mail/php?id=systemA_012345) is transmitted from the relay unit 4 to the first external server 8 (step 59 in FIG. 7).

Figure 9:
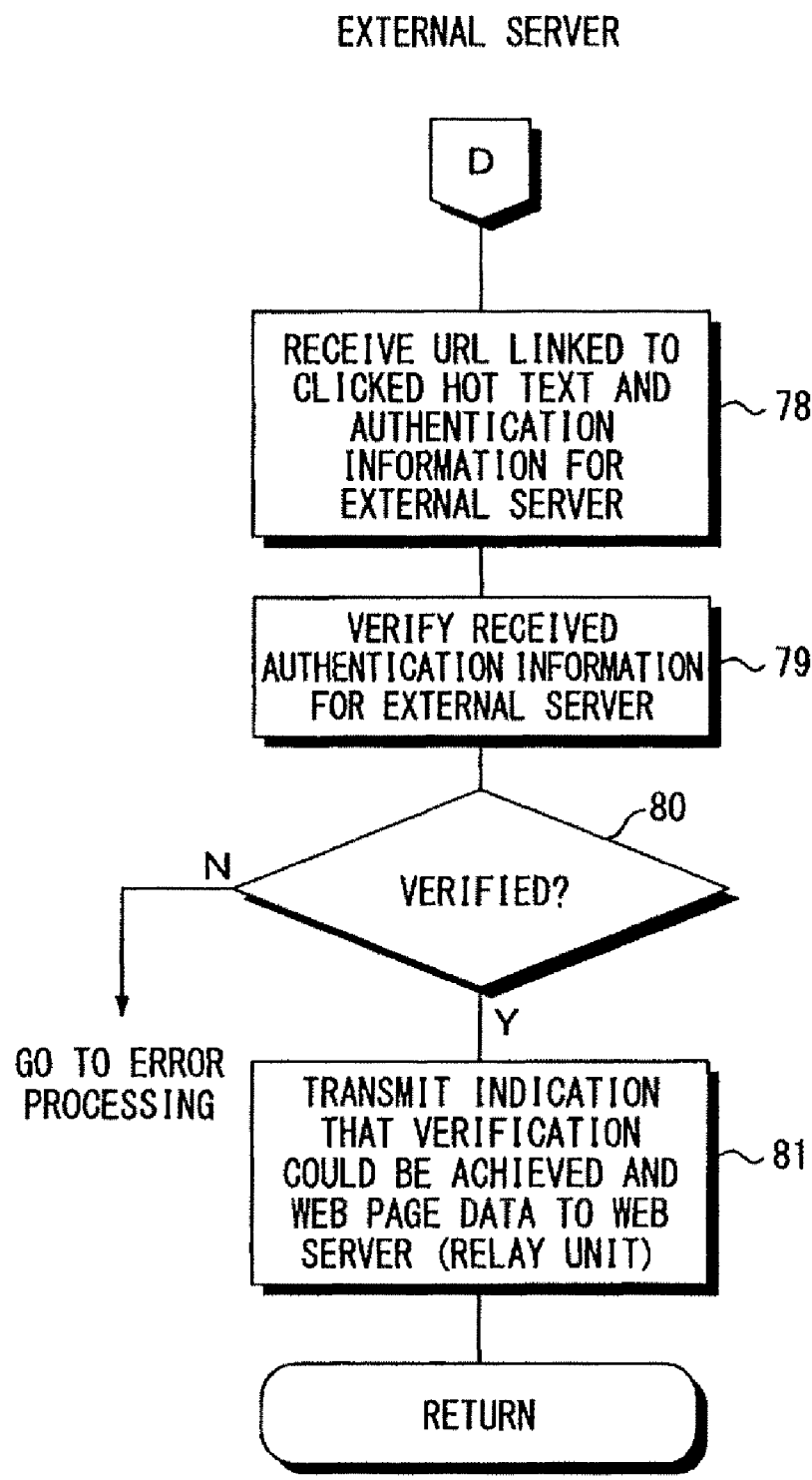
FIG. 9 is a flowchart illustrating processing executed by a first external server.

When the URL with the appended authentication information for the external server transmitted from the relay unit 4 is received by the first external server 8 (step 78 in FIG. 9), the authentication information for the external server is verified (step 79 in FIG. 9). When it is ascertained by verification of the authentication information for the external server that the access to the first external server 8 is access from a verified device ("YES" at step 80 in FIG. 9), data representing the fact that verification could be achieved, as well as web page data representing the web page specified by the URL (http://systemA.com/mail/php?id=systemA_012345) linked to the hot text clicked at the mobile telephone 1, is transmitted from the first external server 8 to the relay unit 4 (step 81 in FIG. 9).

If, when the data representing the fact that verification could be achieved and the web page data transmitted from the first external server 8 are received by the relay unit 4 ("YES" at step 60 in FIG. 7), authentication information has been stored in the authentication information table for the external servers, then this information is updated to the new authentication information. If there is no authentication information in the authentication information table for the external servers, then the new authentication information is simply stored in the table (step 61 in FIG. 7).

Next, the authentication information for the external server is changed to the authentication information for the web server (that is, changed from http://systemA.com/mail/php?id=systemA_012345 to http://systemA.com/mail/php?id=user01), and the authentication information for the web server and web page data are transmitted from the relay unit 4 to the authentication unit 3 (step 62 in FIG. 7).

When the authentication information for the web server and the web page data transmitted from the relay unit 4 are received by the authentication unit 3 (step 40 in FIG. 5), the authentication unit 3 transmits the authentication information for the web server and the web page data to the mobile telephone 1 (step 41 in FIG. 5).

Figure 3:
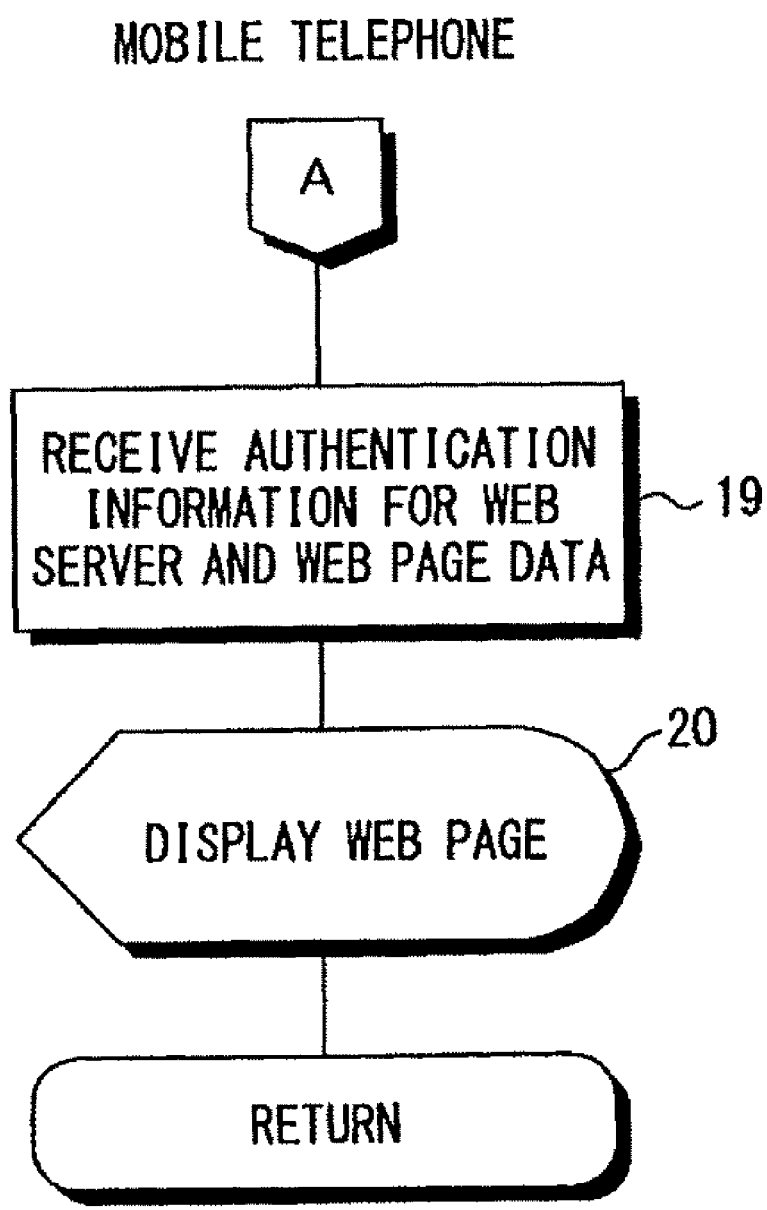
FIG. 3 is a flowchart illustrating processing executed by a mobile telephone.

When the authentication information for the web server and the web page data transmitted from the authentication unit 3 is received by the mobile telephone 1 (step 19 in FIG. 3), the web page represented by the received web page data is displayed on the display screen of the mobile telephone 1 (step 20 in FIG. 3). In this case, the web page of the mail service provided by the first external server 8 is displayed on the display screen of the mobile telephone 1.

By way of example, a link http://systemA.com/mail_detail.php?id=user01 has been embedded in the web page (http://systemA.com/mail/php?id=user01) of this mail service. If the web page at the URL of this link destination is requested by the user of the mobile telephone 1, this URL (http://systemA.com/mail_detail.php?id=user01) is transmitted from the mobile telephone 1 to the web server 2, where the authentication information (user01) for the web server is returned to the authentication information (abc012345) of the external server. When this is done, a command to erase the authentication information for the external server is applied to the first external server 8 and the first external server 8 executes authentication processing again using the user ID for the external server and the password for the external server, as described above.

Thus, merely by transmission of the single set composed of user ID and password from the mobile telephone 1, authentication processing in the web server 2 and authentication processing in the first external server 8 is executed and single sign-on is achieved.

FIGS. 18 to 22 illustrate another embodiment of the present invention.

Figure 18:
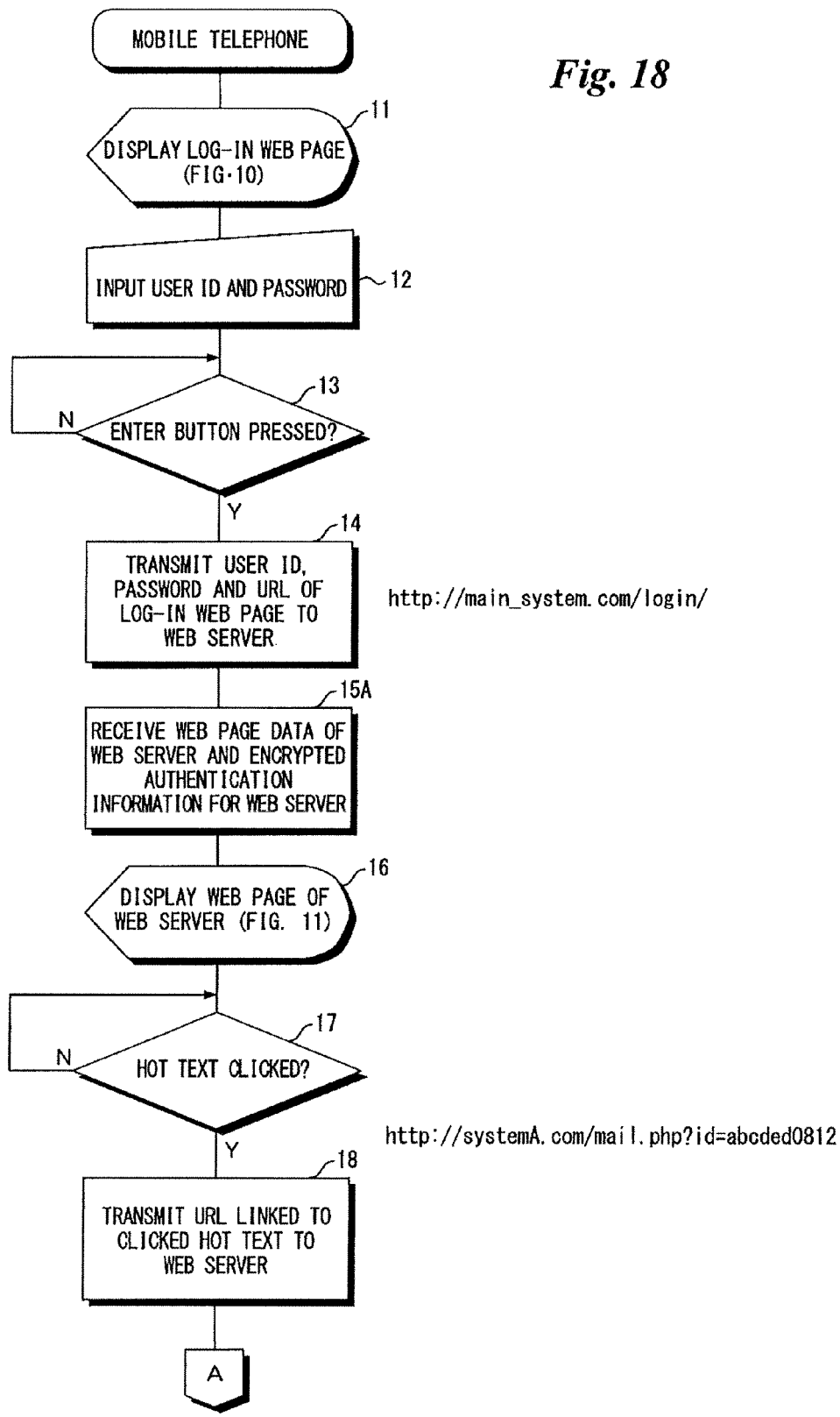
FIG. 18 is a flowchart illustrating processing executed by a mobile telephone.
Figure 19:
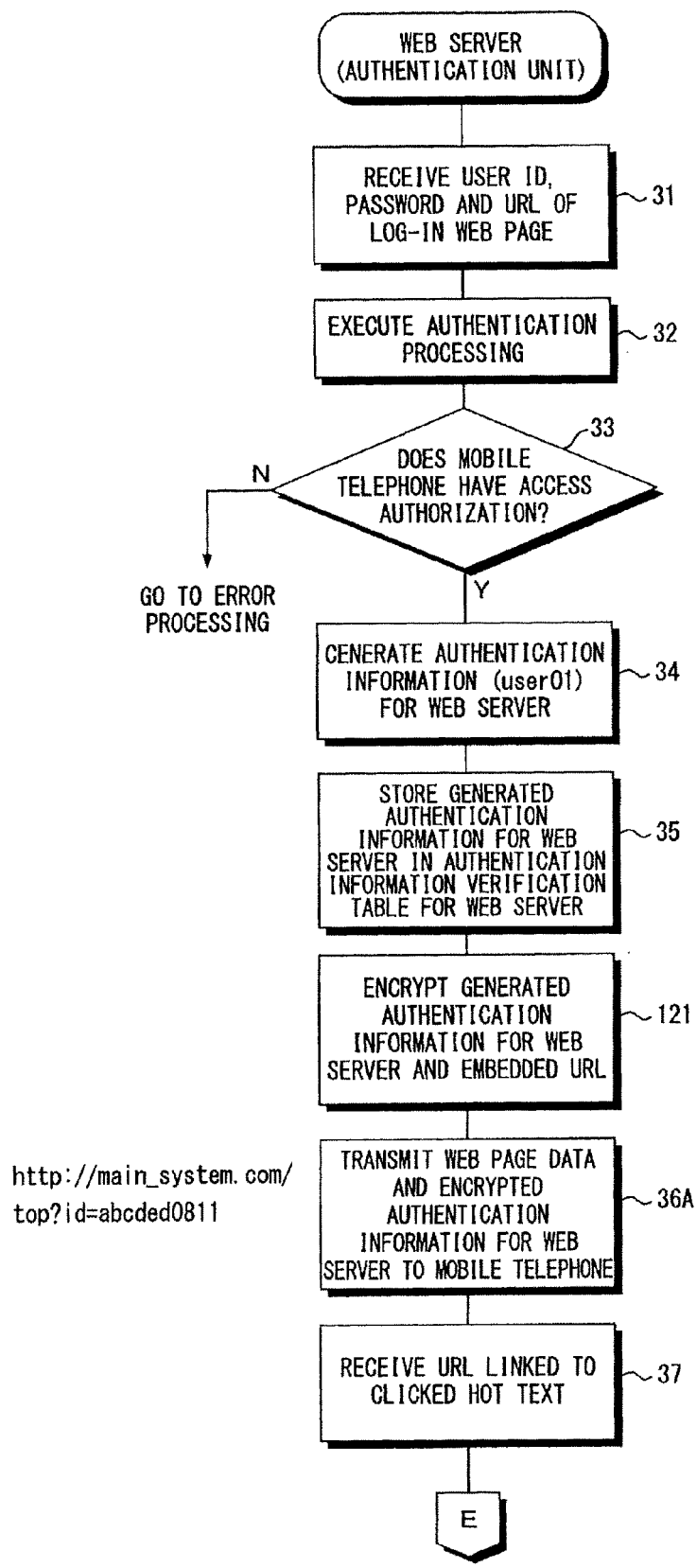
FIG. 19 is a flowchart illustrating processing executed by an authentication unit.
Figure 20:
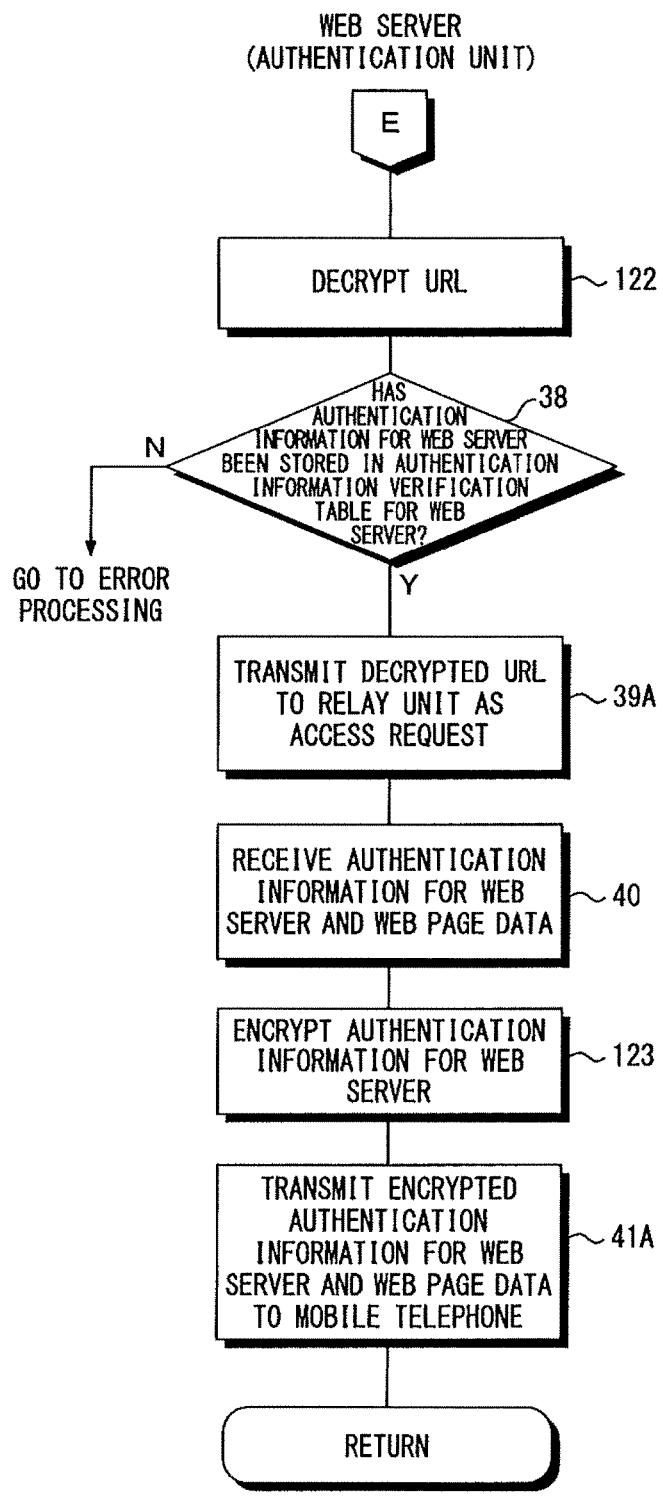
FIG. 20 is a flowchart illustrating processing executed by an authentication unit.

FIG. 18 is a flowchart illustrating a portion of processing executed by the mobile telephone 1 and corresponds to the processing shown in FIG. 2. FIGS. 19 and 20 are flowcharts illustrating processing executed by the authentication unit 3 of web server 2 and correspond to the processing of FIGS. 4 and 5. Processing steps in these flowcharts identical with those shown in FIGS. 2 to 5 are designated by like step numbers and need not be described again. FIG. 21 is an example of an encryption/decryption table stored in the database 6.

In this embodiment, an encryption/decryption unit 7 included in the authentication unit 3 is utilized. Authentication information for the web server that has been appended to an URL communicated between the mobile telephone 1 and web server 2 is encrypted utilizing encryption/decryption unit 7. In a case where an URL is communicated between the mobile telephone 1 and web server 2, the fact that the authentication information for the web server has been encrypted means that even if the URL is intercepted, it is possible to prevent an unauthorized third party from being erroneously recognized as a user having authorization.

As described above, if authentication processing is executed in the authentication unit 3 of web server 2 with regard to the user of mobile telephone 1 and it is verified that the user of the mobile telephone 1 has the right to access the web server 2, then authentication information for the web server is generated (step 34 in FIG. 19). Then, in this embodiment, the generated authentication information for the web server is encrypted (step 121 in FIG. 19).

FIG. 21 is an example of an encryption/decryption table.

When the authentication information for the web server is encrypted, as described above, the encrypted authentication information for the web server is stored in the encryption/decryption table in correspondence with the user ID and URL (original URL) to which has been appended the authentication information for the web server that prevailed before encryption. By referring to the encryption/decryption table, the authentication information of the web server that prevailed before encryption can be ascertained from the encrypted authentication information of the web server.

This embodiment is such that in addition to the authentication information of the web server being encrypted as described above, the URL of a link destination is also encrypted when the link has been embedded in (linked to) the web page requested from the mobile telephone 1. The link-destination URL also is stored in the encryption/decryption table. It goes without saying that the link-destination URL that prevailed before encryption can be ascertained from the encrypted link-destination URL.

With reference again to FIG. 19, the web page data requested from the mobile telephone 1 and the encrypted authentication information of the web server are transmitted from the authentication unit 3 of web server 2 to the mobile telephone 1 (step 36A). The encrypted authentication information for the web server is appended to the URL, for example, and then transmitted to the mobile telephone 1. If the authentication information for the web server is not encrypted, then the URL transmitted to the mobile telephone 1 will be, e.g., http://main_system.com/top?id=user01 (the authentication information for the web server that prevailed before the encryption of id=user01). In a case where the authentication information for the web server has been encrypted, however, the URL transmitted to the mobile telephone 1 becomes http://main_system.com/top?abcded0811, by way of example.

When the web page data and encrypted authentication information for the web server transmitted from the authentication unit 3 of web server 2 are received by the mobile telephone 1 (step 15A in FIG. 18), the web page data represented by the received web page data is displayed on the display screen of the mobile telephone 1 (step 16 in FIG. 18), as illustrated in FIG. 11. The link-destination URL that has been embedded also has been encrypted. When the hot text included in the web page is clicked, therefore, the URL to which the encrypted authentication information of the web server has been appended, which is the link-destination URL linked to the clicked hot text, is transmitted from the mobile telephone 1 to the authentication unit 3 of web server 2. For example, if the character string 111 reading "MAIL" is clicked, the URL to which the encrypted authentication information of the web server has been appended (namely http://systemA.com/mail.php?abcded0812) is transmitted from the mobile telephone 1 to the authentication unit 3 of web server 2 (step 18 in FIG. 18).

When the URL transmitted from the mobile telephone 1 is received by the authentication unit 3 of web server 2 (step 37 in FIG. 19), the original URL to which the authentication information for the web server that prevailed before encryption is found (http://systemA.com/mail.php?id=user01) by referring to the encryption/decryption table. The URL (original URL) for which the authentication information of the web server has been decrypted is transmitted from the authentication unit 3 to the relay unit 4 as the access request (step 122, "YES" at step 38 in FIG. 20).

When the authentication information for the web server and web page data are transmitted from the first external server 8 via the relay unit 4 and are received by the authentication unit 3 (step 40 in FIG. 20), as described above, the authentication information for the web server is encrypted (step 123 in FIG. 20) in a manner similar to that described above. The web page data and the encrypted authentication information for the web server are transmitted from the authentication unit 3 to the mobile telephone 1 (step 41A in FIG. 20). If a link has been embedded in the web page, the authentication information for the web server contained in the link-destination URL is also encrypted, as described above. Further, the encrypted authentication information of the web server is stored in the encryption/decryption table in correspondence with the original URL. The authentication information of the web server encrypted as described above is decrypted using the encryption/decryption table.

In the foregoing embodiment, the encryption/decryption processing is executed by the encryption/decryption unit 7 included in the authentication unit 3. However, an arrangement may be adopted in which the encryption/decryption unit 7 is made a device separate from the authentication unit 3, decoding is performed in the encryption/decryption unit 7 and the decrypted authentication information for the web server is transmitted from the encryption/decryption unit 7 to the authentication unit 3. Further, although the processing in the foregoing embodiment is implemented using hardware, some or all of the processing may be executed using software.

In the processing described above, it goes without saying that the user ID for identifying the mobile telephone 1 may be transmitted together with the URL, etc., in the communication between the mobile telephone 1 and web server 2. Whether the authentication information for the web server made to correspond to this user ID has been transmitted from the mobile telephone 1 is verified in the authentication unit 3 utilizing the user ID.

As many apparently widely different embodiments of the present invention can be made without departing from the spirit and scope thereof, it is to be understood that the invention is not limited to the specific embodiments thereof except as defined in the appended claims.

What is claimed is:

1. A web server constituting a mobile-telephone single sign-on system in which, in response to a mobile telephone being authenticated at a web server, the mobile telephone becomes capable of accessing an external server, which is different from the web server, without authentication processing being executed between the external server and the mobile telephone, said web server comprising:

an authentication processing device for executing authentication processing to authenticate the mobile telephone in response to an access request, which is transmitted from the mobile telephone, to access a web page of the web server;

a first web page data transmitting device for transmitting web page data, which represents the web page of the web server, to the mobile telephone in response to verification by said authentication processing device of the fact that the mobile telephone has the right to access the web page of the web server;

a determination device, responsive to receipt of an access request, which is for accessing a web page of the external server, transmitted from the mobile telephone in response to the mobile telephone receiving the web page data of the web server transmitted from the first web page data transmitting device, for determining whether mobile-telephone authentication information for the external server, which is stored in accordance with verification of the fact that the mobile telephone has the right to access the web page of the external server, has been stored in a storage device;

an erase-command transmitting device, responsive to a determination by said determination device that the mobile-telephone authentication information for the external server has been stored, for transmitting to the external server an erase command, which is for erasing the authentication information for the external server stored in the external server in response to verification of the fact that the mobile telephone has the right to access the web page of the external server;

a user information transmitting device, responsive to transmission of the erase command to the external server by said erase-command transmitting device or to a determination by said determination device that the mobile-telephone authentication information for the external server has not been stored, for transmitting user information to the external server, the user information, which has been stored in advance, being used in authentication processing to determine whether the mobile telephone has the right to access the web page of external server;

a receiving device for receiving the authentication information for the external server and the web page data representing the web page, which are transmitted from the external server, in response to verification of the fact that the mobile telephone has the right to access the web page of the external server, this being verified by authentication processing executed at the external server in response to transmission of the user information to the external server by said user information transmitting device;
a storage control device for controlling the storage device so as to store the authentication information for the external server received by said receiving device; and
a second web page data transmitting device for transmitting the web page data, which has been transmitted from the external server and received by said receiving device, to the mobile telephone.

2. The apparatus according to claim 1, further comprising:
a web-server-use authentication information generating device for generating mobile-telephone authentication information for the web server in response to verification by said authentication processing device of the fact that the mobile telephone has the right to access the web page of the web server; and
an encrypting device for encrypting the authentication information for the web server generated by said web-server-use authentication information generating device;
wherein said first web page data transmitting device transmits the authentication information for the web server encrypted by said encrypting device and the web page data representing the web page of the web server to the mobile telephone;
said web server further comprises a decrypting device for decrypting the encrypted authentication information for the web server in response to receipt of the request for accessing the web page of the external server and the encrypted authentication information for the web server, which are transmitted from the mobile telephone in response to the mobile telephone receiving the authentication information for the web server and the web page data representing web page of the web server, which have been transmitted from said first web page data transmitting device; and
said user information transmitting device, responsive to the authentication information for the web server decrypted by said decrypting device matching the authentication information for the web server generated by said web server authentication information generating device and, moreover, to transmission of the erase command to the external server by said erase-command transmitting device or to a determination by said determination device that mobile-telephone authentication information for the web server has not been stored, transmits user information to the external server, the user information, which has been stored in advance, being used in authentication processing to determine whether the mobile telephone has the right to access the web page of external server.

3. A method of controlling operation of a web server constituting a mobile-telephone single sign-on system in which, in response to a mobile telephone being authenticated at a web server, the mobile telephone becomes capable of accessing an external server, which is different from the web server, without authentication processing being executed between the external server and the mobile telephone, said method comprising:
executing authentication processing to authenticate the mobile telephone in response to an access request, which is transmitted from the mobile telephone, to access a web page of the web server;
transmitting web page data, which represents the web page of the web server, to the mobile telephone in response to verification of the fact that the mobile telephone has the right to access the web page of the web server;
in response to receipt of an access request, which is for accessing a web page of the external server, transmitted from the mobile telephone in response to the mobile telephone receiving the transmitted web page data of the web server, determining whether mobile-telephone authentication information for the external server, which is stored in accordance with verification of the fact that the mobile telephone has the right to access the web page of the external server, has been stored in a storage device;
in response to a determination that the mobile-telephone authentication information for the external server has been stored, transmitting to the external server an erase command, which is for erasing the authentication information for the external server stored in the external server in response to verification of the fact that the mobile telephone has the right to access the web page of the external server;
in response to transmission of the erase command to the external server or to a determination that the mobile-telephone authentication information for the external server has not been stored, transmitting user information to the external server, the user information, which has been stored in advance, being used in authentication processing to determine whether the mobile telephone has the right to access the web page of external server;
receiving the authentication information for the external server and the web page data representing the web page, which are transmitted from the external server, in response to verification of the fact that the mobile telephone has the right to access the web page of the external server, this being verified by authentication processing executed at the external server in response to transmission of the user information to the external server;
controlling the storage device so as to store the received authentication information for the external server; and
transmitting the received web page data, which has been transmitted from the external server, to the mobile telephone.

4. A non-transitory recording medium storing a control program readable by a web server constituting a mobile-telephone single sign-on system in which, in response to a mobile telephone being authenticated at a web server, the mobile telephone becomes capable of accessing an external server, which is different from the web server, without authentication processing being executed between the external server and the mobile telephone, the program controlling the operation of the web server so as to:
execute authentication processing to authenticate the mobile telephone in response to an access request, which is transmitted from the mobile telephone, to access a web page of the web server;
transmit web page data, which represents the web page of the web server, to the mobile telephone in response to verification of the fact that the mobile telephone has the right to access the web page of the web server;
in response to receipt of an access request, which is for accessing a web page of the external server, transmitted from the mobile telephone in response to the mobile telephone receiving the transmitted web page data of the web server, determine whether mobile-telephone authentication information for the external server, which is stored in accordance with verification of the fact that the mobile telephone has the right to access the web page of the external server, has been stored in a storage device;

in response to a determination that the mobile-telephone authentication information for the external server has been stored, transmit to the external server an erase command, which is for erasing the authentication information for the external server stored in the external server in response to verification of the fact that the mobile telephone has the right to access the web page of the external server;

in response to transmission of the erase command to the external server or to a determination that the mobile-telephone authentication information for the external server has not been stored, transmit user information to the external server, the user information, which has been stored in advance, being used in authentication processing to determine whether the mobile telephone has the right to access the web page of external server;

receive the authentication information for the external server and the web page data representing the web page, which are transmitted from the external server, in response to verification of the fact that the mobile telephone has the right to access the web page of the external server, this being verified by authentication processing executed at the external server in response to transmission of the user information to the external server;

control the storage device so as to store the received authentication information for the external server; and transmit the received web page data, which has been transmitted from the external server, to the mobile telephone.

\* \* \* \* \*